P. NEERUP.
TROWEL.
APPLICATION FILED JUNE 11, 1909.
938,070.
Patented Oct. 26, 1909.
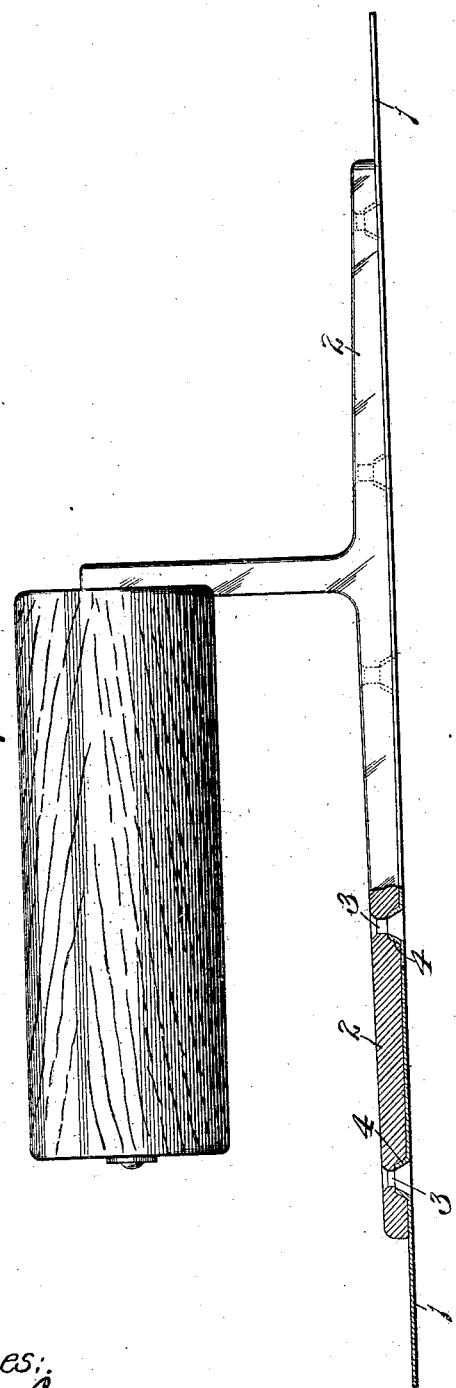
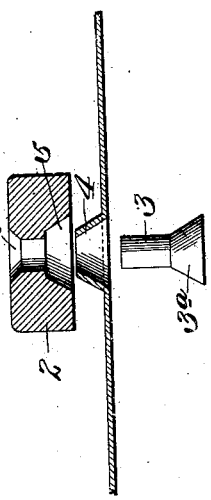
Witnesses:
Inventor:
Peter Neerup.
by Paul Bakewell
Atty.

UNITED STATES PATENT OFFICE.

PETER NEERUP, OF LOUISIANA, MISSOURI, ASSIGNOR TO BUFFUM TOOL COMPANY, OF LOUISIANA, MISSOURI, A CORPORATION OF MISSOURI.

TROWEL.

938,070.    Specification of Letters Patent.    Patented Oct. 26, 1909.

Application filed June 11, 1909. Serial No. 501,532.

*To all whom it may concern:*

Be it known that I, PETER NEERUP, a citizen of the United States, residing at Louisiana, Missouri, have invented a certain new and useful Improvement in Trowels, of which the following is a full, clear, and exact description, such as will enable others skilled in the art to which it appertains to make and use the same.
This invention relates to trowels, and similar tools which comprise a comparatively thin blade that is connected to a shank on a handle by means of rivets.

I have herein shown my invention embodied in a plasterer's trowel but I wish it to be understood that my broad idea is not limited to such a tool for various other tools could be constructed in the same manner without departing from the spirit of my invention.

A trowel blade must be flexible and therefore it must be formed of comparatively thin metal. As the metal is not thick enough to countersink the heads of the rivet into same it has heretofore been the practice to use lightweight rivets whose heads wear off quickly and thus permit the blade to become detached from the shank of the trowel.

One object of my invention is to provide a tool of this character in which the blade is of uniform thickness and is so formed that the rivets cannot wear away sufficiently to permit the blade to become detached from the shank of the tool.
Another object is to provide a tool of the character described in which the top faces of the heads of the rivets lie flush with the outer surface of the blade, the blade being so formed that comparatively heavy rivets can be used for connecting it to the shank.

Figure 1 of the drawings is a side elevational view of a plasterer's trowel constructed in accordance with my invention, a portion of the blade and shank being shown in vertical section to more clearly illustrate the novel features of my invention; and Fig. 2 is an enlarged detail view of the shank, blade, and one of the rivets, the shank and blade being shown in section.
Referring to the drawings which illustrate the preferred form of my invention, 1 designates the blade of the trowel, and 2 designates the shank to which said blade is connected by means of a plurality of rivets 3.
The blade 1 is of uniform thickness and is provided with approximately frusto-conical-shaped flanges 4 that surround the openings in said blade through which the rivets pass, said flanges being formed by bending portions of the blade. The shank 2 is provided on its under side with recesses 5 for receiving said flanges so that the blade will bear directly on the under side of the shank 2. The heads 3ª of the rivets fit snugly in the tapered flanges 4 on the blade so that the top faces of said heads will lie flush with the bottom face of the blade and said rivets are retained in position by upsetting the shanks of same, the shank 2 being provided on its upper face with recesses 6 for receiving the upset portions of said rivets.

In view of the fact that the blade 1 is provided on its upper side with tapered projections or flanges that are securely clamped to the side walls of the recesses 5 in the shank 2 by the heads of the rivets, it will be obvious that the rivets can never wear away sufficiently to permit the blade to become detached from the shank 2. Even when the blade has completely worn away the rivets and the flanges 4 will still be connected to the shank 2 so that the trowel can be used for a much longer period than the trowels which have heretofore been in use. The bottom face of the blade is perfectly smooth and is not provided with pockets or recesses that can become filled with mortar, and as heavy rivets can be used for connecting the blade to the shank 1 a very strong and serviceable tool is produced.

While I have herein shown a construction in which the blade is provided on one side with tapered flanges that completely surround the openings through which the fastening devices pass, I do not wish it to be understood that my broad idea is limited to this exact construction for, if desired, the blade could be merely provided with wings or projections arranged adjacent the fastening device openings.

Having thus described my invention, what I claim as new and desire to secure by Letters Patent is:

1. In a tool, a blade of uniform thickness provided with an opening and a bent tapered flange which surrounds said opening and projects laterally from one face of said blade, and a fastening device projecting through said opening and having a head that engages said flange and clamps it to the member that carries the blade, the top face of said fastening device lying flush with the bottom surface of said blade, and the head of said device completely filling the opening in the blade.

2. In a tool, a blade of uniform thickness provided with an opening and a bent flange surrounding said opening, a member provided with a recess for receiving said flange and bearing directly on the upper side of said blade, and a fastening device connected to said member and having a head that fits in said flange, the top face of said head lying flush with the under side of said blade.

3. A tool comprising a shank provided with a tapered recess, a blade of uniform thickness provided with an opening surrounded by a tapered flange that fits in said recess so that the blade will bear tightly against the under side of said shank, and a fastening device passing through said opening to connect said blade to said shank, said fastening device being provided with a tapered head that fits in said flange and lies flush with the under side of said head.

4. A trowel comprising a shank provided with a plurality of tapered recesses, a blade of uniform thickness provided with a plurality of openings, tapered flanges on said blade that fit in said recesses and thus permit the shank to bear directly on the blade, and rivets connected to said shank and having heads that completely fill said tapered flanges.

5. A trowel comprising a blade of uniform thickness provided with openings and bent projections or flanges arranged adjacent the edges of said openings, a shank provided with recesses for receiving said projections or flanges so that the blade will bear directly on the under side of said shank, and fastening devices passing through said openings and connected to said shank, the top faces of said fastening devices lying flush with the bottom face of said blade.

In testimony whereof I hereunto affix my signature in the presence of two witnesses, this seventh day of June, 1909.

PETER NEERUP.

Witnesses:
OLE C. GRIFFITH,
BEULAH MCALISTER.